United States Patent [19]
Roberts

[11] Patent Number: 5,121,720
[45] Date of Patent: Jun. 16, 1992

[54] PRE-IGNITION LUBRICATING SYSTEM

[76] Inventor: David R. Roberts, 395 Castleridge Dr., Atlanta, Ga. 30342

[21] Appl. No.: 791,394

[22] Filed: Nov. 14, 1991

[51] Int. Cl.⁵ .............................................. F01M 5/00
[52] U.S. Cl. ........................ 123/196 S; 123/179.1; 184/6.3
[58] Field of Search .................... 123/196 S, 196 R; 184/6.3, 6.4

[56] References Cited

U.S. PATENT DOCUMENTS

| | | | |
|---|---|---|---|
| 2,736,307 | 2/1956 | Wilcox | 184/6.3 |
| 3,556,070 | 12/1971 | Holcomb | 123/196 S |
| 3,583,525 | 6/1971 | Holcomb | 123/196 S |
| 3,583,527 | 6/1971 | Raichel | 123/196 S |
| 4,199,950 | 4/1980 | Hakanson et al. | 123/196 CP |
| 4,291,653 | 9/1981 | Tucker | 123/179.2 |
| 4,502,431 | 3/1985 | Lulich | 123/179.1 |
| 4,628,877 | 12/1986 | Sondles et al. | 123/196 S |
| 4,890,695 | 1/1990 | Morris et al. | 184/6.3 |
| 4,936,272 | 6/1990 | Whitmore | 123/196 S |
| 5,069,177 | 12/1991 | Dokonal | 123/196 S |

Primary Examiner—Tony M. Argenbright
Assistant Examiner—Erick Solis
Attorney, Agent, or Firm—Hopkins & Thomas

[57] ABSTRACT

A pre-ignition lubricating system for an internal combustion engine includes an auxiliary oil pump that is activated in response to the driver's door of a vehicle being opened. A timer circuit insures adequate pre-lubrication after the driver's door is closed.

9 Claims, 1 Drawing Sheet

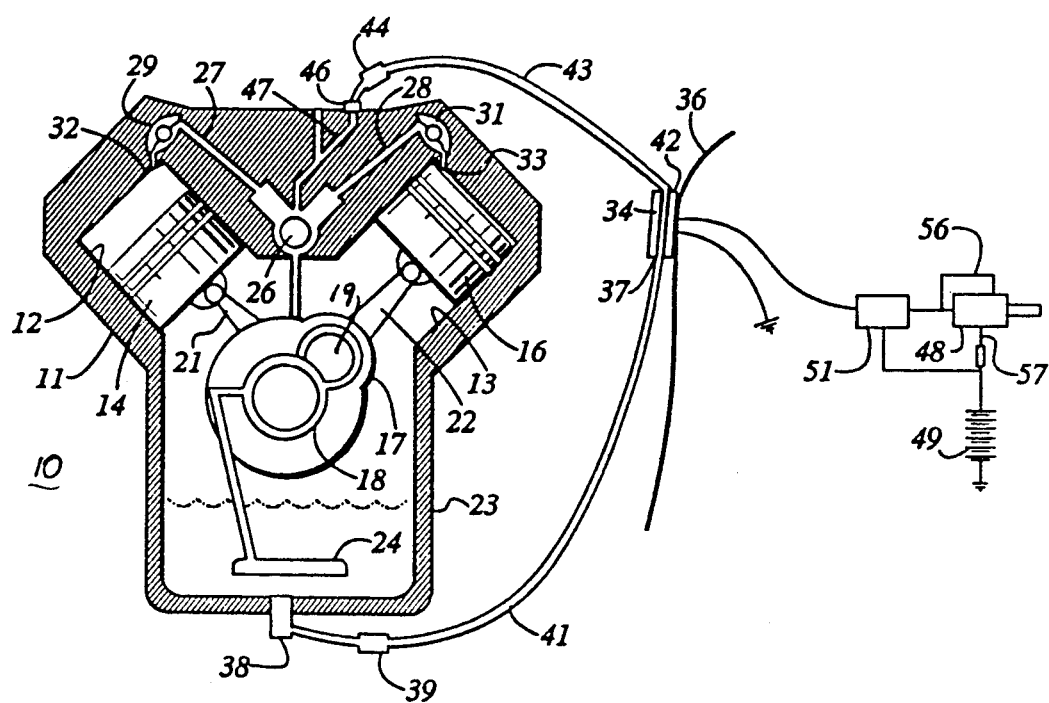
FIG 1
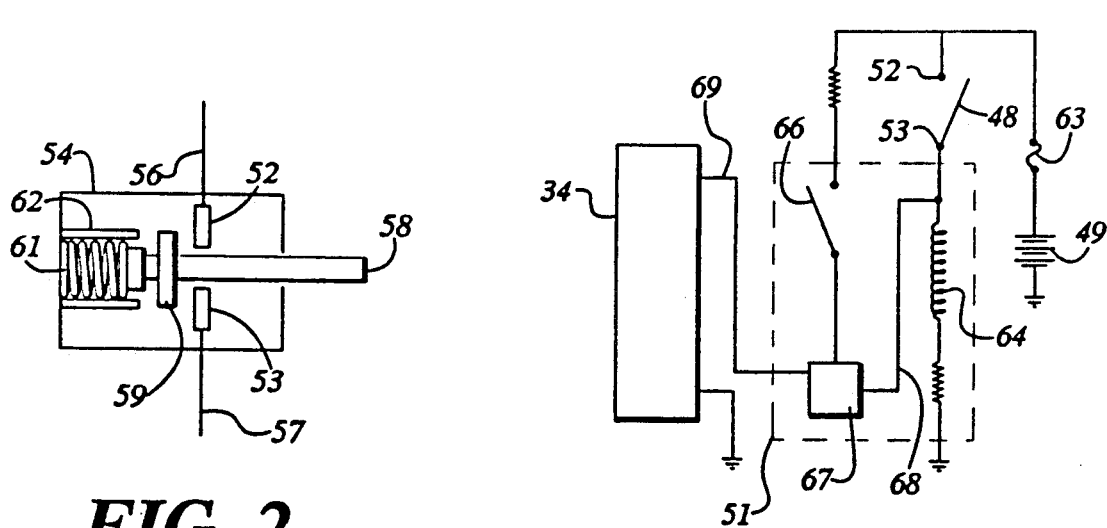
FIG 2
FIG 3

1

PRE-IGNITION LUBRICATING SYSTEM

FIELD OF THE INVENTION

This invention relates to a lubrication system for an internal combustion engine, and, more particularly, to a system for lubricating engine parts prior to operation thereof.

BACKGROUND OF THE INVENTION

In the operation of internal combustion engines, it is necessary to provide adequate lubrication of the engine parts to minimize wear, which normally does not present a problem when the engine is being operated, but presents numerous problems when the operative cycle of the engine is being initiated.

Wear of engine parts is only partially dependent upon engine operation and, generally, is maintained at a minimum when the engine is operated for a continuous, albeit substantial, period of time. Lubricating systems of most internal combustion engines are generally more than adequate for maintaining a steady and ample supply of lubricant to the engine parts while the engine is operating. It is well known that a vehicle driven steadily for a relatively long period of time over a long distance, for example, will experience substantially less engine wear than one that is subjected to numerous stops, e.g., one that is driven on a plurality of frequent, short trips, even though the total mileage of the latter vehicle may be substantially less than that of the vehicle that is driven steadily. It has been determined that approximately seventy to eighty percent of the engine wear occurs during the first ten to fifteen seconds of operation of the vehicle, and hence the engine, and it is to the alleviation of such wear that the present invention, as well as numerous prior art arrangements, is directed.

In U.S. Pat. No. 4,502,431 of Lulich there is shown a pre-combustion diesel engine lubrication system wherein the starter motor is sued to drive an oil pump prior to cranking the engine being cranked. Actuation of the starter motor occurs when the starter switch is moved to the heat position, which is common in diesel engines, but not gasoline engines, for example. The operator must wait before initiating cranking, not only for the pre-lubrication, but for the glow plugs to heat the cylinders and the oil.

Application of lubricant under pressure to the engine parts is shown in U.S. Pat. Nos. 3,556,070 of Holcomb, 3,583,525 of Holcomb, and 3,583,527 of Raichel. In the inventions of these patents, oil is stored under pressure in an accumulator, and is released upon actuation of the starter switch. Thus, generally, the oil is released as engine cranking commences. Such arrangements require a reservoir of oil under pressure even when the vehicle is idle, which is both difficult to achieve and complicated, and is vulnerable to leaks, as well as presenting a safety hazard. Also, although the oil is delivered under pressure, delivery does not occur until the cranking of the unlubricated engine commences, thus wear is still present, although reduced somewhat.

U.S. Pat. No. 4,199,950 of Hakanson et al disclosed a lubrication system wherein oil is delivered in a high pressure spray as starting commences. This arrangement is similar to those discussed in the foregoing in that cranking and lubrication commence simultaneously, hence there is some unlubricated movement of the engine parts.

A prior art arrangement which does not rely on cranking to start the pre-lubrication is shown in U.S. Pat. No. 4,628,877 of Sundles et at. The system of this patent requires that the ignition and switch be turned to the "ON" position, which energizes an auxiliary oil pump which pre-lubricates the engine, after which the switch is turned to the "START" position and the engine is cranked. For the system to work properly, the operator, as is also the case in the Lulich patent, must wait an interval of time before cranking the engine.

From the foregoing it can be seen the that prior art systems, for the most part, allow some unlubricated engine action prior to pre-lubricating. Those systems that pre-lubricate before any engine movement require the operator to wait a period of time before cranking the engine.

SUMMARY OF THE INVENTION

The present invention is a pre-lubrication system for an internal combustion engine which does not require or rely on oil stored under pressure, nor which requires the operator to wait for an interval of pre-lubrication before cranking the engine to start it, yet which reliably produces adequate pre-lubrication of the engine prior to the cranking thereof, thereby reducing wear to a minimum.

The system of the invention comprises, in a first preferred embodiment thereof, an auxiliary oil pump that may be mounted, for example, within the engine compartment on an inner fender well. An oil line leads from the bottom of the engine oil sump through a T fitting and a one-way check valve to the input side of the auxiliary oil pump. The output side of the oil pump is connected via an oil line through a one-way check valve to an oil input at the top of the engine.

The pump, which is twelve volt electrical motor driven, is actuated by means of a plunger switch mounted in the driver's side door jamb of the vehicle, the switch being connected in series between the vehicle battery and the coil of a relay. The contacts of the relay are connected in series between the battery and a timer switch which is connected to the relay coil and to the pump motor. Thus, when the driver's side door of the vehicle is opened, the plunger switch closes, applying current to the relay coil, causing the relay contacts to close. When the driver is within the vehicle and closes the door the plunger switch opens, but current is still applied to the relay coil through the contact and the timer switch, and current continues to be applied to the pump motor even though the plunger switch, which initially started the pump motor, is open. The timer switch, which is preferably adjustable cuts the current to the relay coil after a desired interval, which may be from five to ten seconds, thereby opening the relay contacts and the circuits to the relay coil and to the pump motor. The relay and timer may be contained together in a single module mounted, for example, adjacent the pump motor.

When the operator inserts the key in the ignition and cranks the engine, he does not have to wait, inasmuch as the parts of the engine most subject to wear at start-up, i.e., the crankshaft main bearings, the camshaft and bearings, the risers and/or lifters, and the rocker arms, have all been pre-oiled by the system of the invention.

As a consequence of the foregoing, pre-oiling of the engine parts is accomplished expeditiously and reliably without imposing any waiting period and without creating any safety hazard.

The features of the present invention will be readily apparent from the following detailed description, read in conjunction with the accompanying drawings.

BRIEF DESCRIPTION OF THE DRAWINGS

FIG. 1 is a cross-sectional elevational view of an internal combustion engine and associated parts embodying the present invention;

FIG. 2 is a diagrammatic view of a plunger switch for use with the present invention; and, FIG. 3 is a schematic view of one circuit for controlling the operation of the present invention.

DETAILED DESCRIPTION

In FIG. 1 there is shown, in elevation cross-section, an automobile engine 10, which, for purposes of illustration, is depicted as a V-type engine. Engine 10 comprises an engine block 11, cylinders 12 and 13, pistons 14 and 16, a crankshaft 17 having main bearings 18 and connecting rod bearings 19, connecting rods 21 and 22, and an oil sump 23, containing an oil pump 24. Engine 10 also includes a camshaft 26, risers 27, 28, rocker arms 29, 31 and valves 32, 33. In operation, oil pump 24 pumps oil from sump 23 through the oil conduits, shown in cross-hatching, to lubricate the parts of the engine enumerated in the foregoing. Generally, pump 24 generates a pressure of approximately 30 psi (pounds per square inch) which is maintained during normal operation. It can be seen that when the engine is not operating, the oil, under the effect of gravity, tends to drain down into the sump 24, leaving the various parts of engine 10 unlubricated. Thus, when an ordinary engine is cranked, those parts are essentially unlubricated until pump 24 fills the conduits with oil under 30 psi pressure.

In the embodiment of the invention shown in FIG. 1, an auxiliary oil pump 34 is mounted, for example, on the interior surface 36 of the fender well of the vehicle. Pump 34 is supplied at its input end 37 with oil from sump 23, which passes through a T-fitting 38, a check valve 39 and oil conduit 41 which is connected to the input end 37 of pump 34. Check valve 39 permits oil to pass from sump 23 to pump 34, but blocks passage of oil from pump 34 to the sump 23.

Oil passes from the output side 42 of pump 34 through oil conduit 43, check valve 44, and a fitting 46 into an oil passage 47 within engine 10. Oil passage 47 represents any of a number of such passages within an engine that communicate with the exterior. An example of one such passage is the oil passage for the oil pressure sending unit (not shown), which controls the oil pressure gauge on the dashboard of the vehicle. From oil passage 47 oil is distributed, at approximately 30 psi, throughout engine 10 when pump 34 is operated.

Pump 34 is actuated by a plunger switch 48, which is connected in series with the anode or plus side of the vehicle battery 49, and with a timer and relay circuit 51, to the positive polarity input to the motor of pump 34, which is preferably a twelve volt D.C. electrical motor. Plunger switch 48 is mounted in the driver's side door jamb of the vehicle and is designed to be open when the door is closed, and closed when the door is open. The construction of such a switch 49 is shown in FIG. 2. Switch 48, as shown in FIG. 2, comprises first and second contacts 52 and 53 mounted in a switch housing 54 and having leads 56 and 57 attached thereto. An actuating plunger 58 having a contact member 59 mounted thereon is adapted for reciprocal movement within housing 54 and is biased by a coil spring 61 retained in a sleeve 62 within housing 54. When the vehicle door is closed, plunger 58 and hence contact 59 are moved to the left, as shown in FIG. 2, against the force of spring 61 and held there by the door, thus preventing contact 59 from closing the circuit between contacts 52 and 53. When the door is opened, spring 61 moves plunger 58 to the right, as viewed in FIG. 2, and contact 59 closes the circuit between contacts 52 and 53, thereby causing current to flow from battery 49 through timer and relay circuit 51 to the motor of pump 34. Switch 48, as shown in FIG. 2, is only one of a number of possible switch arrangements that are capable of closing the circuit when the vehicle door is opened.

FIG. 3 is a schematic diagram of the electrical circuitry for controlling the operation of pump 34. The positive side of battery 49 is connected through a fuse 63 to one of the contacts such as contact 52, of plunger switch 48. The other contact 53 is connected to a relay coil 64 within timer and relay module 51. One side of the relay contacts 66 is connected directly to the positive side of battery 49, and the other side is connected to timer switch 67. Timer switch 66 is connected through lead 68 to the same side of coil 64 as contact 53, and to the motor of pump 34 through lead 69, the other side of which is connected to ground.

In operation, when the vehicle door is opened, plunger switch 48 closes and applies power to coil 64, thereby energizing the relay and closing contacts 66. When the vehicle door is closed by the operator, timer switch 67 continues to apply power to coil 64 and the motor of pump 34, because the relay coil 64 remains energized and contacts 66 remain closed. Pump 34 pumps oil from the sump 23 to the vital parts of the engine, as pointed out in the foregoing. The timer switch 67, which may be set for any preferred interval, although an interval of ten seconds is sufficient, opens after expiration of the interval, thereby de-energizing relay coil 64 and opening contacts 66, shutting off power to auxiliary pump 34. It is to be understood that the circuit of FIG. 3 is only one of any number of possible circuit arrangements which accomplish the desired end of turning pump 34 on as the operator opens the vehicle door, and keeping it on for an interval sufficient to accomplish pre-lubrication of the engine 10. The time that elapses after the operator opens the door of the vehicle, seats himself therein, and inserts the key in the ignition is sufficient to accomplish pre-lubrication so that he may immediately crank the engine without waiting. As a consequence, there is no movement of unlubricated parts, engine wear is minimized, and there is no interval during which the operator must wait before cranking the engine.

When the operator exits the vehicle, the auxiliary pump will again be energized. However, this will simply pump oil into the engine for the predetermined interval determined by the setting of the timer switch, and the oil thus pumped will drain into the sump.

While the principles and features of the present invention have been shown in a preferred embodiment, various changes or modifications may occur to workers in the art without departure from the spirit and scope of the invention.

I claim:

1. A system for pre-lubricating an internal combustion engine of a vehicle which has an oil reservoir and at least one oil passage communicating with the exterior of the engine and the vehicle has doors for ingress and egress of an operator, said system comprising:
an auxiliary oil pump having an input side and an output side,
means for connecting the input side of said oil pump to the oil reservoir,
means for connecting the output side of said oil pump to an engine oil passage communicating with the exterior of the engine, and
means for energizing said oil pump comprising:
switch means responsive to the opening of a door of the vehicle for connecting a source of electrical energy to said pump, and
timer means for maintaining the connection between the source and said pump for a predetermined time interval.

2. The system as claimed in claim 1 wherein said means for energizing further comprises a relay having contacts and an energizing coil, said contacts being connected in series between the source of electrical energy and said timer means.

3. The system as claimed in claim 2, wherein said switch means is connected in series between the source of electrical energy and said energizing coil.

4. The system as claimed in claim 2 wherein said timer means is connected in series between said contacts and said energizing coil.

5. The system as claimed in claim 1, wherein said switch means comprises a plunger switch adapted to close when the vehicle door is opened, and to open when the vehicle door is closed.

6. The system as claimed in claim 1 wherein said switch means is adapted to close when the driver's vehicle door is opened.

7. For use with the internal combustion engine of a vehicle wherein the engine has an oil sump and at least one oil passageway communicating with the exterior of the engine and the vehicle has at least a driver's door for ingress and egress, a pre-lubrication system comprising:
an oil pump having an input and an output,
first oil conduit means having a first end connected to said oil pump input and a second end adapted to be connected to the oil sump of the engine,
second oil conduit means having a first end connected to said oil pump output and a second end adapted to be connected to the externally communicating oil passageway,
means for activating said oil pump comprising a plunger switch responsive to the opening of the driver's door for connecting said oil pump to a source of electrical power, and
timer means interposed between said pump and the source of electrical power for maintaining a temporary connection therebetween after the driver's door has been closed, and
means for disconnecting said timer means from the source of electrical power after a predetermined time interval after the driver's door has been closed.

8. A pre-lubrication system as claimed in claim 7 and further comprising means adapted to permit oil flow through said first conduit means from the sump to said oil pump and to block oil flow from said oil pump to the engine sump.

9. A pre-lubrication system as claimed in claim 7 and further comprising means adapted to permit oil flow through said second conduit means from said pump to the externally communicating passageway and to block oil flow from the externally communicating passageway to said oil pump.

* * * * *